3,503,772
SiO₂-ZnO TREATED TiO₂ PIGMENTS FOR
PAPER LAMINATES
David P. Fields, Wilmington, Del., assignor to E. I. du
Pont de Nemours and Company, Wilmington, Del., a
corporation of Delaware
No Drawing. Continuation-in-part of application Ser. No.
565,389, July 15, 1966. This application Dec. 27, 1966,
Ser. No. 604,581
Int. Cl. C08h *17/00;* C08j *1/36;* C09c *1/36*
U.S. Cl. 106—300                                     10 Claims

ABSTRACT OF THE DISCLOSURE

Rutile $TiO_2$ pigments coated with from about 2% to 25% of $SiO_2$ and 0.1 to 3.0% of ZnO, and containing from 0.5 to 10% of a water-soluble (alkali metal) carboxymethyl cellulose, said amounts being by weight and based on the $TiO_2$.

CROSS REFERENCE TO RELATED APPLICATION

This application is a continuation-in-part of my copending application Ser. No. 565,389 filed July 15, 1966, and now abandoned.

BACKGROUND OF INVENTION

This invention relates to the preparation of titanium dioxide pigments having improved in-process characteristics, retention properties in paper systems, and resistance to degradation in paper laminates and other formulations upon exposure to ultraviolet light.

The treatments herein contemplated can be applied to any type of crystalline $TiO_2$ pigment, e.g. anatase or rutile, the major portion of the individual particles of which have an average diameter of less than 0.5 micron and preferably are between 0.18 and 0.25 micron to possess such essential pigment properties as hiding power or opacity. Its benefits are particularly applicable to the treatment of rutile pigments especially those obtained from the vapor phase oxidation of $TiCl_4$ in accordance with, for example, the disclosures of U.S. Patents 2,488,439 or U.S. 2,559,638. Anatase $TiO_2$ is obtained by precipitation from titanium sulfate solution hydrolysis and is subsequently calcined to develop essential pigmentary size and properties in accordance with the procedures of U.S. Reissue Patent 18,854.

SUMMARY OF THE INVENTION

In accordance with the invention an improved $TiO_2$ pigment in either anatase or rutile crystalline form is provided which contains as essential ingredients coatings of from 2–25% by weight of $SiO_2$ and from 0.1 to 3.0% by weight of ZnO, both amounts being based on the $TiO_2$; and, optionally, from 0.5 to 10%, by weight of the total pigment composition, of a water-soluble carboxymethyl cellulose, preferably sodium carboxymethyl cellulose, adsorbed on the pigment, said carboxymethyl cellulose having a degree of substitution of 0.4 to .85. Addition of the $SiO_2$ and ZnO components to the $TiO_2$ is brought about through successive precipitations from water-soluble silicon and zinc salts, followed by calcination of the treated and washed pigment at from 300–800° C. Thereafter, the product can be dry milled in the presence of the desired amount of alkali metal carboxymethyl-cellulose to improve the retentiveness of the $TiO_2$ in paper, especially paper laminates.

DESCRIPTION OF THE PREFERRED EMBODIMENTS

In its more specific aspects the invention is directed to novel ZnO and $SiO_2$ rutile $TiO_2$ pigments obtained by dispersing a $TiO_2$ pigment in water, mixing with the resulting slurry a water soluble silicate while maintaining the pH of the slurry below 8, during addition of the last and major (more than 50%) of said silicate, maintaining the pH of the slurry between 5 and 8, after thorough incorporation of the said silicate in the slurry, adding a soluble zinc salt to said slurry, adjusting the pH value of slurry to 6.5–7.5 to render the zinc insoluble, removing salts from the pigment by filtering and washing, and then calcining the zinc-containing product in air at about 500° C.

Preferably, the pigment slurry is heated to and maintained at temperatures in the range of 30 to 90° C. and particularly at about 60° C. during the silicate and the zinc salt additions and pH adjustment, and is held at these temperatures for from about 15 minutes to 2 hours following each salt addition.

In practically adapting the invention, the $TiO_2$ pigment is slurried in water which is purified, if necessary, to render it compatible with pigment processing, e.g. is low or lacking in iron. Slurry concentrations ranging from 100–500 g./l. $TiO_2$ can be employed, with a preferred concentration ranging from 300–400 g./l.

The resulting slurry can be heated to about 60° C. and a water solution of an alkali metal silicate, such as sodium silicate, or a highly dispersed silicic acid sol prepared by deionizing a soluble silicate can be used with accompanying agitation during the addition. The amounts of silicate used can vary from 2 to 25% $SiO_2$ based on the $TiO_2$, with amounts ranging from 5 to 12% or 8 to 12% being most usefully employable. In some cases the base $TiO_2$ forms an acid slurry in water. In such instances the acid can be neutralized by the initial portion of silicate solution added. When the slurry is brought into a 6–8 pH range, the level of hydrogen ion concentration is maintained in that range by the simultaneous incorporation, if necessary, of a suitable neutralizing agent e.g. $H_2SO_4$ during the addition of the remainder of the silicate. At this point the slurry is allowed to cure at temperature for about 30 minutes. A soluble zinc salt such as a sulfate, chloride or nitrate, e.g. $ZnSO_4$, $ZnCl_2$, $Zn(NO_3)_2$, etc. preferably the sulfate, or a water-soluble alkali metal zincate, such as $Na_2ZnO_2$ is then added to the slurry, the amount of zinc ranging from 0.1 to 3% and preferably from 0.5 to 2% ZnO, based on the $TiO_2$. The zinc salt is preferably dissolved in water and added with accompanying slurry agitation. The zinc treated slurry obtained is adjusted to 6.5 to 7.5 pH to render the zinc insoluble, and another cure is applied. Thereafter the treated pigment is recovered from the slurry by conventional filtration and is washed to remove at least the bulk of the soluble salts present.

The recovered filter cake is then dried and the dry pigment calcined, in a direct fired continuous rotary or other form of kiln, to a temperature ranging from 300° C. to 850° C., and preferably in the range of 400° C. to 600° C. Calcination of the product dehydrates the precipitated silica and zinc compounds and stabilizes them in close association with the $TiO_2$ particles. Cementation or sintering of the particles which may occur is subsequently remedied by a dry fluid energy milling treatment as in a micronizer. The resulting Si and zinc oxide coated pigment can be then employed in various pigment applications, e.g. in paper laminates, paints, enamels and finishes where pigment stability against light or other degrading influences is an essential requisite.

To a clearer understanding of the invention the following specific example is given which should not be considered as limiting the underlying principles and scope of the invention.

EXAMPLE I

Rutile titanium dioxide was prepared by heating separate streams of oxygen and $TiCl_4$ containing a small amount of $AlCl_3$ and reacting these gases in a closed reaction chamber whose inner walls were maintained below the reaction temperature. The $TiO_2$ effluent from said chamber was slurried in water at a concentration of 350 g./l. $TiO_2$. The slurry was found to be acidic due to the presence of residual traces of titanium oxychlorides, HCl, etc. It was then heated to 60° C. and a solution of sodium silicate (water glass) at 200 g./l. $SiO_2$ was incorporated therein with stirring until the slurry pH was 7.5. Addition of the silicate solution was continued with simultaneous addition of 25% $H_2SO_4$ at a rate which kept the pH of the well agitated slurry between 6.5 and 7. Enough silicate was added to provide 10% by weight of $SiO_2$ on the $TiO_2$. After such addition the slurry, still under agitation, was held at 60° C. for 30 minutes. A 21% zinc sulfate solution was then incorporated in the slurry in an amount equivalent to 1% ZnO by weight, based on the $TiO_2$. The slurry pH was then adjusted to 7.0 with NaOH soln. and held at 60° C. for 30 minutes. The resulting slurry, now flocculated, was filtered and washed until the filtrate was substantially free of sulfate ions as determined by adding a $BaCl_2$ soln. Portions of the washed filter cake were placed in 2 liter silica flasks which were rotated in a furnace. Air was passed slowly through the flasks while they were heated over a period of 5 hours to various predetermined maximum temperatures shown in the table below. The calcined pigments were then dumped from the flasks, cooled in air, pulverized in a mortar and subjected to fluid energy milling in a small micronizer, using superheated steam as the fluid medium at a rate of 1.5 pounds per pound of pigment.

As a control, a representative series of prior art pigments were prepared in identical fashion, except that 1% of $Al_2O_3$ instead of ZnO was added, as aluminum sulfate. Both sets of pigments were then incorporated in melamine-resin-bonded paper laminate test samples for 48 hours exposure to ultraviolet light in a "Fade-Ometer," with a portion of each sample shielded from the light. This is a conventional method of accelerating the degradation of the whiteness of the laminate as compared with sunlight. The discoloration was evaluated visually on a 1 to 10 scale by comparing the exposed portion with the shielded part. The larger numbers on such scale are indicative of greater color stability and each unit change in the scale reflects a material variation.

TABLE

| | Control | Pigment Product of Example |
|---|---|---|
| Calc. Temp., °C.: | | |
| None | 1 | 1 |
| 300 | 3 | 4 |
| 400 | 4 | 6 |
| 500 | 5½ | 6½ |
| 600 | 5 | 6 |
| 700 | 4½ | 5 |

As will be evident this invention provides a process for the sequential precipitation of the hydrous silica and zinc hydroxide on a $TiO_2$ pigment in an aqueous slurry followed by a mild calcination treatment of the treated pigment to obtain an improved, light stable product. The pH conditions for precipitation of the hydrous silica are important. Any pH below 8 will suffice for such precipitation but this and higher pH values causes undesired loss of opacity in paper systems. Hence, carrying out the precipitation in the range of 5 to 7 is preferred. The zinc is preferably precipitated from solution in the slurry by raising the pH to the 6.5–7.5 range. Mild calcination of the silica and zinc treated pigment further improves pigment properties, especially resistance to photochemical degradation of whiteness in paper laminate systems.

Advantages resulting from the use of zinc in combination with $SiO_2$ in this particular manner include a marked improvement in pigment filtration rate, especially when the zinc is added as the sulfate or similar salt. This not only saves time but improves the washing efficiency leading to desirable lower soluble salt content of the final product: A further improvement and advantage resides in the improved light stability of the product due to protection against degradation of color or whiteness on exposure to ultraviolet light when in contact with organic vehicles or other materials.

To impart, if desired, improved retention characteristics to the $SiO_2$-ZnO treated $TiO_2$ pigment compositions of this invention and to enhance their usefulness in paper pulp systems, and particularly for paper laminate manufacture, they can be subjected to an impact milling treatment in the dry state with a minor amount of a water-soluble carboxymethyl cellulose in accordance with, for example, the disclosure of U.S. 3,205,085. Thus following recovery, the calcined $SiO_2$-ZnO treated $TiO_2$ product can be dry-milled in a ring-roller mill, hammer mill, swing mill, squirrel cage disintegrator, ball, rod or tube mill, etc. to blend with and incorporate in the pigment from 0.5–10%, and preferably from 1.5–3%, by weight, based on the finished pigment, of an alkali metal (Na, K, Li) as well as ammonium salt of carboxymethyl cellulose. Of these, sodium carboxymethyl cellulose having a degree of substitution (D.S.) within a range of .3 to 1.5, and especially in the range of 0.40 to 0.85, comprises a preferred agent. As an example of this after-treatment of the pigments of this invention the following is illustrative:

EXAMPLE II 6000 pounds/hr. of rutile $TiO_2$ containing 10% $SiO_2$ and 1% ZnO by weight, prepared in accordance with the procedures in the first paragraph of Example I, were fed into a continuous blending system made up of an automatic weighing vibrating feeder by means of which high molecular weight sodium carboxymethyl cellulose (CMC) was being introduced at a rate of 120 pounds/hr. into the $TiO_2$ pigment stream being fed to a bin above a 24-inch swing hammer mill. The CMC was in dry pulverulent form and had a degree of substitution of 0.7 to 0.8 and exhibited a viscosity of 1800 cp. in 1% water solution. The uniformly blended mixture was then fed to the swing hammer mill which was equipped with a backing screen having 3/16 inch round perforations. The finely divided product from the mill, on analysis, was found to contain 2% by weight of CMC. This product was particularly adapted for use as an opacifying pigment in paper pulp systems and paper laminate manufacture.

The above CMC treatment will, as already noted, render the $TiO_2$ pigments of this invention highly advantageous for use as opacifying pigments in paper making and without incurring objectionable pigment loss due to lack of retention on the wire mesh belt of a Fourdrinier machine employed in such manufacture. In addition pigment dusting or losses arising during running of the paper through calender rolls or printing presses will be effectively minimized.

The CMC-treated pigments of this invention will prove outstandingly useful in the preparation of opacified paper laminates with melamine-formaldehyde plastics. Thus, in such a preparation a finished paper can be impregnated with a slurry made up of the pigment and desired melamine or urea formaldehyde resin. Following drying a plurality of the sheets of impregnated paper are superposed and formed into an opacified paper laminate in accordance with known hot pressing techniques. Alterna-

I claim:

1. A process for improving the light stability of a titanium dioxide pigment which comprises incorporating a water soluble silicate in a slurry suspension of a titanium dioxide pigment while maintaining the slurry at a pH below 8, during addition of the last and major portion of said silicate maintaining the pH of said slurry between 5 and 8, incorporating a soluble zinc salt in said slurry after incorporation of said silicate and adjusting the pH of the slurry to within a range of 6.5 to 7.5, employing in such pigment treatment an amount of silicate and zinc salt sufficient to coat the final pigment with the equivalent of from 2 to 25% $SiO_2$ and 0.1 to 3.0% ZnO based on the $TiO_2$, respectively, filtering and washing the treated pigment, and then calcining it at a temperature between 300 and 850° C.

2. The process of claim 1 in which the resulting pigment is subjected to dry milling with from 0.5 to 10% by weight based on the total composition of a water soluble carboxymethyl cellulose.

3. The process of claim 1 in which the pigment slurry is maintained at temperatures ranging from 30 to 90° C. during salt additions and pH adjustments.

4. The process of claim 3 in which the slurry is cured by maintaining the slurry at 30 to 90° C. temperatures from 15 minutes to two hours following silicate addition and after the final 6.5–7.5 pH adjustment.

5. The process of claim 3 in which the silicate is sodium silicate and the zinc is $ZnSO_4$, the slurry is maintained at a temperature of about 60° C., and calcination is effected at about 500° C.

6. The process of claim 1 in which the calcination temperature ranges from 400 to 600° C.

7. The process of claim 6 in which the pigment treated is rutile recovered from the oxidation of titanium tetrachloride.

8. As a new calcined pigment composition, titanium dioxide coated with from 2 to 25% by weight of precipitated $SiO_2$ and 0.1 to 3.0% by weight of zinc oxide, both amounts being based on the $TiO_2$.

9. The dry calcined pigment composition of claim 8 containing from 0.5 to 10% by weight, based on the total composition, of water-soluble carboxymethyl cellulose absorbed on said pigment.

10. The composition of claim 9 in which the carboxymethyl cellulose is sodium carboxymethyl cellulose.

References Cited

UNITED STATES PATENTS

| | | | |
|---|---|---|---|
| 2,253,551 | 8/1941 | Booge | 106—300 XR |
| 2,290,539 | 7/1942 | Cole | 106—300 |
| 2,296,618 | 9/1942 | Patterson | 106—300 |
| 2,304,947 | 12/1942 | Monk | 106—300 |
| 2,378,790 | 6/1945 | Robertson | 106—300 |
| 3,035,966 | 5/1962 | Siuta. | |
| 3,205,085 | 9/1965 | Bailin | 106—300 |
| 3,383,231 | 5/1968 | Allan. | |
| 3,409,501 | 11/1968 | Siuta. | |

JAMES E. POER, Primary Examiner

H. M. S. SNEED, Assistant Examiner

U.S. Cl. X.R.

106—292, 308